INVENTORS:
SAMMY CARPENTER
ENRIQUE R. WITT
JOSEPH J. CAHILL, JR.
BY
Charles E. Miller
AGENT United States Patent Office 3,567,665
Patented Mar. 2, 1971

3,567,665
POLYURETHANE RESINS CONTAINING
BROMINATED POLYOL ETHERS
Sammy Carpenter, Bolckow, Mo., Enrique R. Witt,
Corpus Christi, Tex., and Joseph J. Cahill, Jr., Colonia,
N.J., assignors to Celanese Corporation
Original application Mar. 12, 1965, Ser. No. 439,466, now
Patent No. 3,385,900, dated May 28, 1968. Divided and
this application Nov. 16, 1967, Ser. No. 699,754
Int. Cl. C08g 22/08, 22/44
U.S. Cl. 260—2.5
5 Claims

ABSTRACT OF THE DISCLOSURE

A flame-retardant polyurethane resin is formed from a mixture comprising at least one organic polyisocyanate and at least one brominated polyol ether which can be a 2,3-dibromopropyl ether of sorbitol or a 2,3-dibromopropyl ether having the general formula:

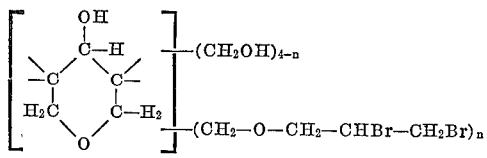

Figure 1:
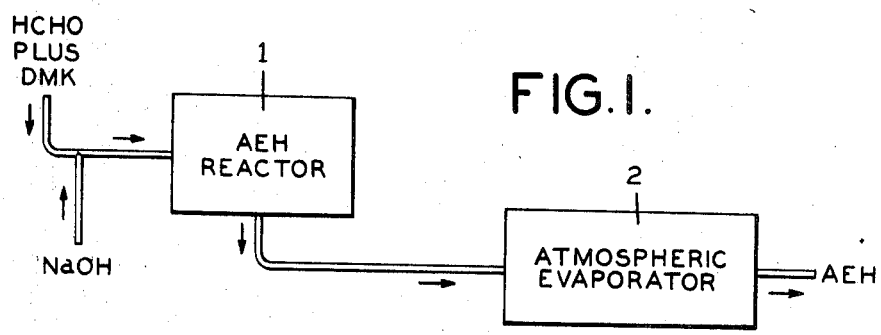

wherein $n$ represents an integer from 1 to 4.

This is a division of U.S. patent application Ser. No. 439,466 filed Mar. 12, 1965 and issued as U.S. Pat. No. 3,385,900.

This invention relates broadly to halogenated organic compounds and, more particularly, to halogen-containing (specifically bromine-containing) polyol ethers, i.e., ethers of polyols. The scope of the invention also includes method and use features.

The invention is especially concerned with a restricted group of halogenated, specifically brominated, polyol ethers having a valuable and unique combination of properties that makes them particularly useful in industrial, agricultural and other applications. This group consists of sub-classes (A), (B) and (C) hereafter described.

SUB-CLASS (A)

The members of this sub-class are represented broadly by the general formula (I)     $(XH_2C-XHC-H_2C-O-H_2C)_x-\underset{|}{C}(R)_z-(CH_2OH)_y$ wherein X represents a halogen (specifically bromine) atom, R (when present) represents a radical selected from the group consisting of alkyl (including cycloalkyl), aralkyl, hydroxyalkyl (e.g., —CH₂OH, —C₂H₄OH, etc.), aryl and alkaryl radicals, $x$ and $y$ each represent an integer from 1 to 3, inclusive, $z$ represents an integer from 0 to 2, inclusive, and $x+y+z$ equals 4. When $z$ is 0, there is no R group attached to the carbon atom in Formula I to which it is shown as being attached. When X represents a bromine atom, then general Formula I may be rewritten as follows:

(II)    $(BrH_2C-BrHC-H_2C-O-H_2C)_x-\underset{|}{C}(R)_z-(CH_2OH)_y$ wherein R, and $x$, $y$ and $z$ have the same meanings as given above with reference to Formula I.

Illustrative examples of radicals represented by R in Formulas I and II, and which may be the same or different when there are two R's (i.e., when $z$ is 2), are alkyl e.g., methyl, ethyl and propyl through decyl (both normal and isomeric forms), cyclopentyl, cyclohexyl, cycloheptyl, etc.; aralkyl, e.g., benzyl, phenylethyl, phenylpropyl, phenylisopropyl, etc.; hydroxyalkyl, e.g., mono-, di-, tri-, etc., hydroxylated alkyls corresponding to the aforementioned unsubstituted alkyls; phenyl, biphenylyl or xenyl, naphthyl, etc.; and alkaryl, e.g., tolyl, xylyl, ethylphenyl, propylphenyl, isopropylphenyl, etc. Preferably the radical or radicals represented by the R or R's individually contain not more than about 7 carbon atoms, more specifically not more than about 4 or 5 carbon atoms, particularly when the compounds are to be used in applications involving the flame-resisting characteristics of the compounds or of compositions containing the same.

SUB-CLASS (B)

The members of this sub-class are represented broadly by the general formula (III)

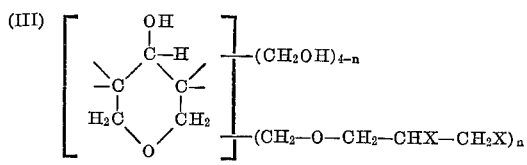

wherein X represents a halogen (specifically bromine) atom, and $n$ represents a positive integer from 1 to 4 (preferably from 1 to 3), inclusive. When $n$ represents 4, then no —CH₂OH grouping is attached to the ring nucleus. When X represents a bromine atom, then each X in Formula III is replaced by Br.

Bromine is the preferred halogen represented by X in Formulas I and III, and the other halogens (chlorine, fluorine and iodine) are not the full equivalent thereof. However, it is not intended to preclude from the scope of the present invention compounds wherein one or more or all of the X's in Formulas I and III represent one or another of the other halogens. Compounds wherein at least one of the X's represents Br and the remaining X's are a different halogen (i.e., chlorine, fluorine or iodine) may have advantages in certain particular applications, e.g., insecticidal, fungicidal, pharmaceutical, etc., applications, or as a chemical intermediate.

SUB-CLASS (C)

The members of this sub-class consist of halogenated, specifically brominated, ethylenically unsaturated ethers, more particularly monoethylenically unsaturated aliphatic hydrocarbon ethers, e.g., allyl, methallyl, propenyl, isopropenyl (beta-allyl), 1-butenyl, 2-butenyl (crotyl), 3-butenyl, 1,4-dichloro-2-butenyl, pentenyl, hexenyl, butadienyl, etc., ethers, of the saccharides, more particularly the mono- and polysaccharides, especially the mono- and disaccharides including such sugars as, for example, sucrose or cane sugar, dextrose or grape sugar, levulose or fruit sugar, lactose or milk sugar, d-mannose, d-galactose and maltose; raffinose which is a trisaccharide; other sugar polyols such as adonitol, xylitol, arabitol, dulcitol, mannitol, sorbitol (d-sorbitol), which latter compound is also known as 1,2,3,4,5,6-hexanehexol, etc.; and the hydrogenated formose condensation products of formaldehyde. The same remarks made hereinbefore with respect to the bromine substituents in the compounds of sub-classes (A) and (B) as compared with the corresponding other halogen (chlorine, fluorine and iodine) substituents also are applicable to the compounds of this sub-class.

Uses of the aforementioned halogenated polyol ethers, in addition to those previously mentioned, include their use as a component (or as a reactant in making a component) of polyurethane foams including rigid polyurethane foams.

Brominated compounds of the kind embraced by sub-classes (A), (B) and (C) can be prepared from the corresponding unbrominated polyol ethers as illustrated by the procedures given in some of the examples which follow.

Halogens other than bromine may be introduced in various ways. For example, the fluoro derivatives may be prepared via halogen exchange starting from the corresponding chloro or fluoro derivatives and silver or lead fluoride (E. H. Rodd, "Chemistry of the Carbon Compounds," Elsevier, 1951, vol. 1A, pp. 331, 677). Chlorine may be introduced into the polyol ethers by direct addition to the double bond, taking reasonable precautions to compensate for its high reactivity by, for example, using adequate dilution of the reaction mass and low reaction temperatures (Rodd, ibid., page 677; Groggins, "Unit Processes in Organic Synthesis," McGraw-Hill Publishing Company, 1947, page 169). The iodine derivatives may be prepared directly from the corresponding ethers and iodine (Rodd, ibid., page 677), or by chlorine or bromine exchange with sodium iodide in acetone, i.e., the so-called Finkelstein reaction (Rodd, ibid., page 331; H. Finkelstein, Ber. 43, 1528 (1910)).

Examples of compounds embraced by Formula I are the mono- and bis(2,3-dibromopropyl) ethers of trimethylolethane (TME), trimethylolpropane (TMP), trimethylolbutane, trimethylolpentane, trimethylolhexane and higher members of the homologous series of trimethylolalkanes; the corresponding ethers of (trimethylol) (phenyl)methane, -ethane, -propane, -butane and higher members of the homologous series of phenyl-substituted alkanes; the mono-(2,3-dibromopropyl) ethers of (dimethylol)[bis(phenyl)]methane, -ethane, -propane and higher members of the homologous series of bis(phenyl) alkanes; ethers, corresponding to the mono- and bis(phenyl) alkanes just mentioned, of the mono- and bis(benzyl) methanes, -ethanes, -propanes, -butanes, etc., and of the mono- and bis(tolyl)methanes, -ethanes, -propanes, -butanes, etc.; the mono-, bis and tris(2,3-dibromopropyl) ethers of pentaerythritol (PE); and the corresponding chloro, fluoro and iodo derivatives of the said ethers. Other examples and their obvious equivalents [e.g., the various (2,3-dibromopropyl) ethers of dipentaerythritol] will be apparent to those skilled in the art from the foregoing, illustrative examples, from Formulas I and II, and from the meanings of x, y and z in said formulas, and from the numerous illustrative examples of radicals represented by R (when present) that previously have been given.

As starting reactants in making useful halogenated polyol ethers area lkylene oxide adducts, more particularly the ethylene oxide and propylene oxide adducts, of the polyols used in making the halogenated polyol ethers set forth in the preceding paragraph. Thus, instead of using trimethylolpropane, (III-A) 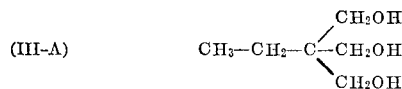

as a starting reactant in making the halogenated derivative, one may use, for example, a compound represented by the general formula (III-B) 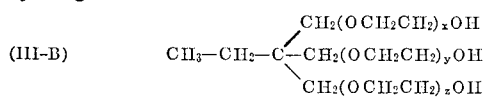

wherein x, y and z each represent a number having an average value ranging from 1 to about 5, inclusive. The alkoxylated polyols are converted to ethylenically unsaturated ethers, specifically allyl ethers, and are halogenated (brominated, chlorinated, fluorinated or iodinated) as herein set forth. Such halogenated derivatives are particularly useful in making flame-retardant, cellular, polyurethane resins, as well as for other purposes.

Examples of compounds embraced by Formula III are the mono, bis, tris and tetrakis(2,3-dibromopropyl) ethers of anhydroenneaheptitol (AEH), and the corresponding chloro, fluoro and iodo derivatives.

Examples of halogenated, specifically brominated, allyl ethers of the carbohydrates, more particularly sugar polyols, of sub-class (C) are the mono-, di- and higher poly-(2,3-dibromopropyl) ethers of sorbitol, mannitol, xylitol and other polyols mentioned by way of example hereinbefore under sub-class (C), and the corresponding chloro, fluoro and iodo derivatives. In general, etherification of up to an average of $n-1$ out of the $n$ hydroxyls of a polyol can be effected without difficulty by suitable adjustment of the reactant ratios. The resulting ether is then halogenated, specifically brominated.

The increasing importance of modifying normally flammable organic materials used, for example, in making textile, household, industrial and other articles, and as construction materials in the building field, has resulted in extensive research on flame-resistant compounds and compositions. Halogen, phosphorus and nitrogen compounds are extensively used in formulations to impart flame-resistance to normally flammable organic compounds or materials. However, difficulties are encountered in introducing an amount of the pertinent element that will impart the desired degree of flame-resistance without adversely affecting the other useful properties of the modified compound or material.

The present invention is based on the applicants' discovery that halogenated compounds of the kind hereinbefore described under sub-classes (A), (B) and (C), and particularly the brominated derivatives, have the unique and unobvious combination of properties that has long been sought in many applications wherein flame-resistance is desired without adversely affecting other useful properties of the modified composition, product or article, e.g., in making polyurethane resins and foams. This appears to be due to the fact that the halogenated compounds of this invention do not merely comprise halogenated, specifically brominated, methyl or methylene groups; but they contain such halogenated groups in a compound which additionally contains both ether linkages and hydroxyl groups. The hydroxyl groups are reactive sites whereby the halogen-containing ether groups can be introduced into other compounds or compositions, e.g., by reaction with an ester-forming compound, such as a mono- or polycarboxylic acid, an aromatic or aliphatic mono- or polyisocyanate or -isothiocyanate, and other compounds that are reactive with an active hydrogen atom.

The preferred halogenated polyol ethers of this invention, i.e., the brominated derivatives, are prepared by contacting the polyol ether corresponding to the desired brominated polyol ether with bromine (or a compound engendering bromine), advantageously while the unbrominated polyol ether is dissolved or dispersed in an inert (substantially inert) liquid reaction medium. Illustrative examples of such reaction media are alkanols, e.g., ethanol, n-propanol, isopropanol, n-butanol and isomeric forms thereof, n-pentanol and isomeric forms thereof, and higher liquid members of the homologous series. Other examples include saturated aliphatic hydrocarbons, e.g., heptane through dodecane (both normal and isomeric forms); aromatic hydrocarbons, e.g., benzene, toluene, xylene, etc.; the various halogenated aromatic hydrocarbons including, for example, the various chloro- and bromobenzenes and toluenes, etc.; and the various halogenated saturated aliphatic hydrocarbons including, for instance, chloroform, carbon tetrachloride, ethylene bromide, ethylene chloride, ethylene chlorobromide, unsym. and sym. tetrachloro- and tetrabromoethanes, 2-bromo-1-chloropropane, 1-bromo-2-chloropropane, propylene chloride, isobutylene bromide, trimethylene chloride, propylidene chloride and bromide, 1,1-dibromo-, 1,2-dibromo-, 1,3-dibromo- and 2,2-dibromopropanes, 2,2-dichloropropane, pentamethylene dichloride, etc. Still other examples include ethers, e.g., m-dioxane, p-dioxane, mixtures of m- and p-dioxanes, pentamethylene oxide, tetrahydrofurfuryl ethyl ether, diethylene glycol diethyl ether, and the various normal and isomeric dialkyl ethers, e.g., di-n-propyl ether, n-butyl ether, isobutyl ether, ethyl butyl ether, methyl amyl ether, methyl benzyl ether, phenyl butyl ether, and other known ethers which are liquid at the reaction temperature. Other examples of inert, anhydrous, liquid, reaction media will be apparent to those skilled in the art from the foregoing illustrative examples.

By "inert" or "substantially completely inert," liquid medium or liquid reaction medium is meant a liquid medium which is so inert or non-reactive toward the reactants and the reaction product that it will not adversely affect the course of the reaction or the constitution of the reaction product. By "liquid medium" (or "liquid reaction medium") is meant a medium which is liquid at the temperature and pressure employed in effecting the bromination reaction. In other words, the inert, liquid medium in which the reaction may be effected may or may not be a liquid at room temperature (20°–30° C.) or at any other temperature below the reaction temperature. Preferably a liquid medium which is volatile (volatilizable) without decomposition is employed.

The reaction between the bromine (or compound engendering bromine) and the unbrominated polyol ether may be carried out at temperatures ranging, for example, from about 0° C. to ambient temperature, e.g., 20°–30° C.

The bromine and the polyol ether are employed in the approximate proportions that are stoichiometrically required to produce the desired brominated polyol ether; or with either slightly, e.g., from 0.5 to 10 mole percent, in excess of the other. Usually, a small molar excess of bromine is employed.

Where economic considerations are not of primary importance or in certain other particular situations, one may use compounds engendering bromine instead of bromine itself. For example, one may employ bromine-containing interhalogen (mixed halogen) compounds such as bromine monochloride. Its use would yield mixed chloro-bromo compounds, and has the advantage that it permits a wider latitude in the halogen and hydroxyl content of the products. Also, when it is desired to form the monobromide instead of the dibromide, one may use hydrogen bromide instead of bromine. The addition at the double bond occurs thusly:

—CH—CH—+HBr→—CHBr—CH$_2$—

Since HBr additions occur mainly by radical mechanisms, certain problems are encountered in the use of HBr that are not normally present when bromine is used. Also, HBr does not add at the double bond at the almost instaneous rate of elementary bromine.

Among examples of other compounds engendering bromine that may be employed in the bromination step are certain bromine cemplexes, such as pyridinium perbromide, $C_5N_6N·Br_3$, and dioxane dibromide, $$C_4H_8O_2·Br_2$$

Illustrative examples of polyol ethers that may be halogenated, specifically brominated, to produce the compounds of this invention are listed below either with reference to a generic or a specific formula:

(IV)  

(V)   $(H_2C=CH-CH_2-O-CH_2)_2-C-(CH_2OH)_2$ (VI)  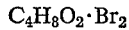

(VII) $(H_2C=CH-CH_2-O-CH_2)_3-C-CH_2OH$ (VIII) $(H_2C=CH-CH_2-O-CH_2)_2-\overset{R}{\underset{|}{C}}-CH_2OH$ (IX)  $H_2C=CH-CH_2-O-CH_2-C-(CH_2OH)_3$ (X) 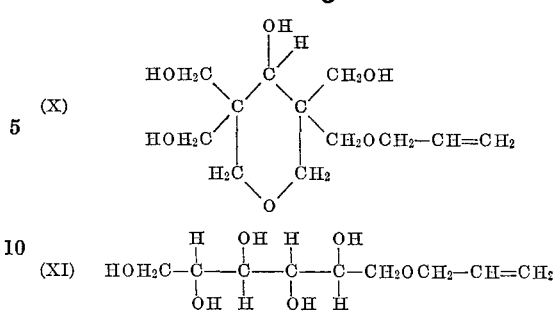

(XI) $HOH_2C-\overset{H}{\underset{OH}{\overset{|}{C}}}-\overset{OH}{\underset{H}{\overset{|}{C}}}-\overset{H}{\underset{OH}{\overset{|}{C}}}-\overset{OH}{\underset{H}{\overset{|}{C}}}-CH_2OCH_2-CH=CH_2$ In Formulas IV, VI and VIII, R has the same meaning as given above with reference to the definition of R in Formulas I and II.

The compounds of Formulas V, VII and IX and those embraced by Formulas IV, VI and VIII are either members or a sub-class of a border class of compounds (i.e., allyl ethers of a polyol) that may be represented by the general formula (XI-A)  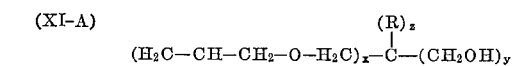

wherein R, when present, and $x$, $y$ and $z$ have the same meanings as hereinbefore given with reference to Formuas I and II.

The compound of Formula X is a monoallyl ether of AEH, and is a species of allyl ethers of AEH that may be represented by the general formula (XI-B) 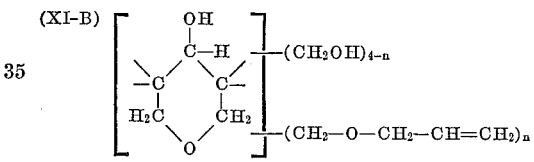

wherein $n$ represents a positive integer from 1 to 4, inclusive, and is preferably 1 or 2.

The compound of Formula XI is a monoallyl ether of sorbitol, which when brominated in accordance with this invention, yields mono-(2,3-dibromopropyl) ether of sorbitol. The allylation of both —CH$_2$OH groupings of sorbitol yields a diallyl ether of sorbitol which, when brominated, provides di-(2,3-dibromopropyl) ether of sorbitol.

The brominated compounds of the invention are made by contacting with bromine an allyl ether of the kind described above while the latter is preferably "dissolved" (within which term is included "dispersed") in an inert liquid reaction medium.

The amount of the bromine employed is at least the stoichiometrical amount required to convert $x$ number of allyl ether groups in the polyol to $x$ number of 2,3-di-bromopropyl ether groups. Thereafter the brominated compound is isolated from the reaction mass in any suitable manner, or is purified by any suitable means such as by flashing off any inert liquid reaction medium that may have been employed, followed by filtration and/or a decolorization treatment as desired or as conditions may require.

In practicing the present invention it is not necessary that one start with the pure or substantially pure polyol ethers. Thus one may, if desired, prepare crude allyl ethers of such polyols as AEH, TMP and PE starting with the parent aldehydes and using standard procedures.

Figure 2:
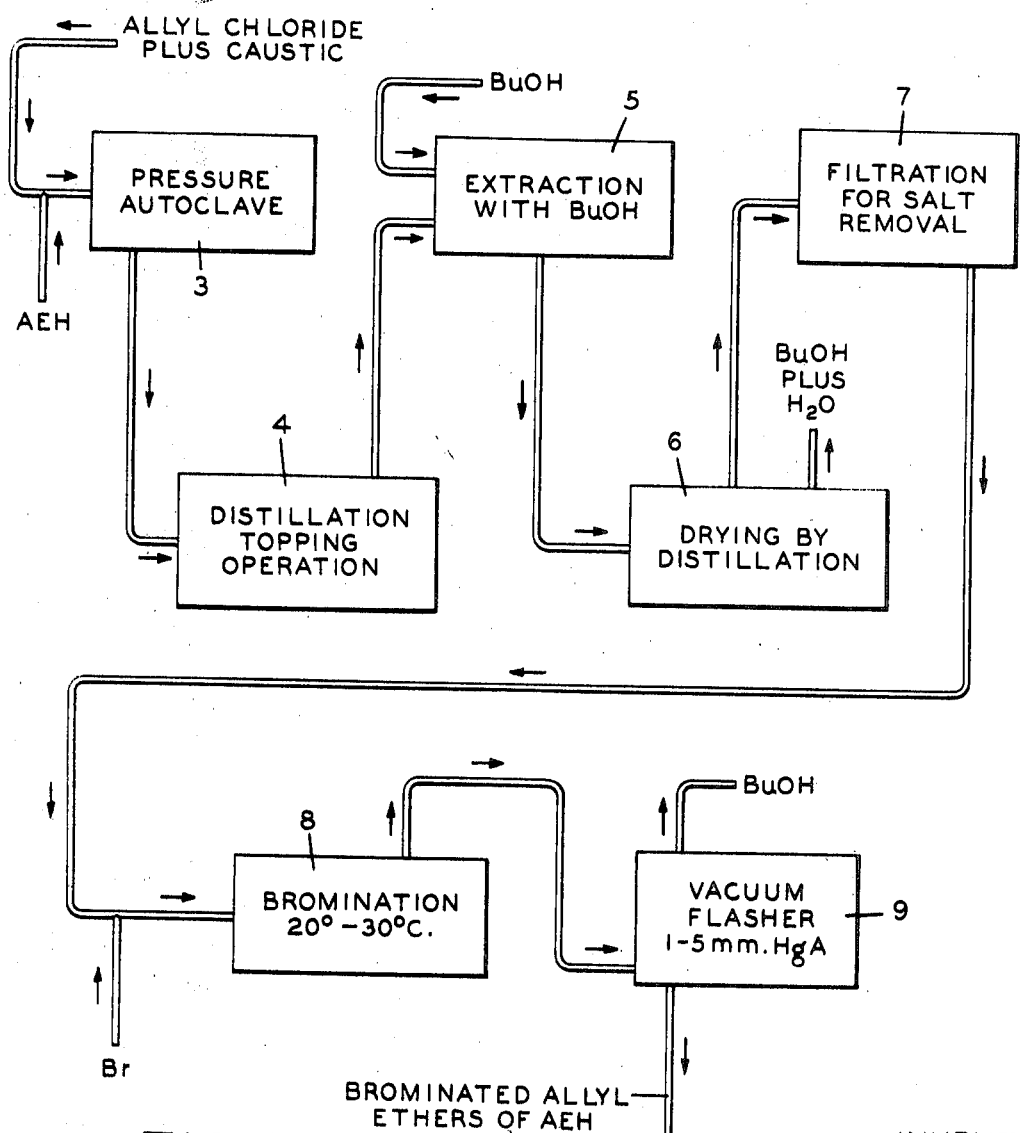

As shown in FIG. 1 and FIG. 2 of the accompanying drawings and in Example 5 that follows, which describe the preparation of mono- and diallyl ethers of AEH, the reaction product from the AEH reactor is 1 evaporated at one atmosphere pressure in atmospheric evaporator 2 to a base temperature of 110° C., additional water being added (when a high molar excess of HCHO is used) to remove most of the HCHO. The crude AEH containing sodium formate (NaFo) and 30–40% water is charged to an autoclave 3 together with the required amount of allyl chloride and an alkali solution, specifically a solution of caustic soda.

The crude allyl ethers of AEH (or of other polyols subjected to allylation) are removed from the autoclave and topped by distillation in distillation topping operation 4 at one atmosphere to remove allyl chloride, diallyl ether and allyl alcohol as low boilers. Two shake-out extractions 5 using a suitable solvent, e.g., n-butanol, are applied to the residue to recover most of the products from salt water containing NaFo and NaCl. Distillation at one atmosphere 6 to remove water as its azeotrope with n-butanol is used to dry the products and to precipitate dissolved salts which are then removed by filtration in 7.

At this stage the allyl ether of the polyol may be isolated, if desired, by means of a vacuum-flashing step to remove the butanol. However, butanol (n-butanol) serves very satisfactorily as an inert diluent and permits the rapid addition of a calculated amount of bromine (based on the number of allyl groups present in the polyol) at ambient temperature (20°–30° C.) in 8. Generally the bromine is added in a slight or a substantial excess as hereinbefore described, and the excess is consumed, for example, by bubbling an olefinic hydrocarbon, specifically ethylene or propylene, into the reaction mass until the excess has been consumed. Complete removal of butanol from the brominated product is attained by vacuum-flashing the brominated polyol ether at, for instance, 1–5 mm. HgA pressure and a base temperature of, for example, about 114° C. in vacuum flasher 9.

Surprisingly, in spite of the relatively high water content (e.g., about 25 to 40%) that is present during the above-described allyl chloride reaction, the allyl chloride efficiency is relatively high, e.g., from about 67% to about 83%. This efficiency indicates that beneficial effects are derived from some source; perhaps either from the low-temperature reaction conditions (i.e., about 80°–90° C.) or as a result of a beneficial salting-out effect exerted by sodium formate, or by a combination of both such influencing factors.

The brominated polyol ethers of this invention are quite viscous at ambient temperature (20°–30° C.) but flow freely at elevated temperatures, e.g., 50°–80° C.

In order that those skilled in the art may better understand how the present invention can be carried into effect, the following examples are given by way of illustration and not by way limitation. All parts and percentages are by weight unless otherwise specified.

EXAMPLE 1

Trimethylolpropane mono-(2,3-dibromopropyl) ether

The preparation of the above compound, which also may be named as the mono-(2,3-dibromopropyl) ether of TMP, by the direct bromination of TMP monoallyl ether is illustrated by the following equation:

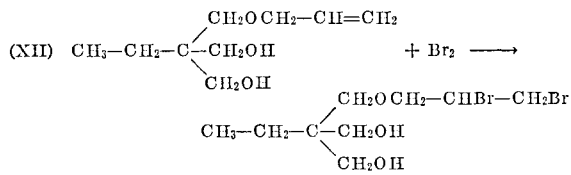

TMP monoallyl ether (851.5 g.; 4.88 moles) is mixed with 500 cc. carbon tetrachloride in which it is completely soluble, and the solution is placed in a 3-necked flask fitted with a stirrer, thermometer and dropping funnel. Bromine, 792 g. (10 g. in excess of theoretical), is introduced through this funnel. Reaction is almost instantaneous and mildly exothermic, requiring cooling of the reactor with ice water.

The reddish reaction product, containing a slight excess of bromine, is left at room temperatures (20°–30° C.) for two hours and then washed as follows: (a) one wash with aqueous sodium metabisulfite solution to destroy excess bromine (upon bleaching, the organic layer is found to consist of two phases, viz, CCl$_4$ and TMP monoallyl ether dibromide phases); (b) two sodium carbonate washes; and (c) two sodium sulfate washes (water alone tends to emulsify the product). If desired, the excess bromine can be removed by bubbling ethylene or propylene through the reaction mass.

The washed organic layer is stripped free of solvent and water, and filtered through a steam-jacketed Büchner funnel. The yield is 1305 g. which corresponds to 80% of the theoretical. The product has the following characteristics:

Appearance—Clear, viscous liquid
Percent Br (calculated: 47.8%)[1]—55.5%
Percent OH (calculated: 10.2%)[1]—8.1%
Iodine number—0.9
Acid number—0.24
Sp. gravity 20°/20°—1.599
Viscosity, SUS at 100° F.—250.2

[1] Note: The relatively high Br and relatively low —OH contents may be due to the presence of TMP diallyl ether admixed with the TMP monoallyl ether of starting reactant.

EXAMPLE 2

Pentaerythritol bis(2,3-dibromopropyl) ether

The aforementioned compound, which also may be named as pentaerythritol diallyl ether tetrabromide, is prepared by the addition of a stoichiometric amount of liquid bromine (or with, for example, from 1% to 10% in excess of theoretical), to pentaerythritol diallyl ether in carbon tetrachloride solvent at 0° to 10° C.

The reaction mixture is washed with a 2% sodium metabisulfite solution followed by a dilute sodium bicarbonate wash and two water washes. (Instead of the sodium metalbisulfite wash, ethylene or propylene may be bubbled through the reaction mass to remove excess bromine.) The product is isolated by flashing off the carbon tetrachloride under vacuum and filtering the remaining material through diatomaceous earth. An analysis of the product follows:

| | Found | Theoretical for pentaerythritol bis(2, 3-dibromopropyl) ether |
|---|---|---|
| Bromine, wt. percent | 59.5 | 59.7 |
| Carbon, wt. percent | 25.1 | 24.6 |
| Hydrogen, wt. percent | 3.7 | 3.7 |
| Acid number | 0.1 | |
| Percent hydroxyl | 6.2 | 6.3 |

EXAMPLE 3

Pentaerythritol tris(2,3-dibromopropyl) ether

The aforementioned compound, which also may be named as pentaerythritol triallyl ether hexabromide, is prepared by the addition of a stoichiometric amount (or using a slight excess) of liquid bromine to pentaerythritol triallyl ether using CCl$_4$ as a solvent. The temperature of the reaction mixture is maintained at 0° to 10° C. during the reaction, and after the addition of the bromine the reaction mass is washed with 500 ml. of 5% sodium metabisulfite solution, and then neutralized with potassium carbonate solution. After two 1000 ml. water washes, the solvent is flashed from the product and the product is isolated by filtration. A heat lamp is used to warm the product during filtration. This causes the product to darken. In order to lighten the product it is treated with carbon black and diatomaceous earth, followed by a second filtration. The product, which is obtained in a yield corresponding to 66% of the theoretical, shows the following upon analysis:

|  | Found | Theoretical |
|---|---|---|
| Bromine, wt. percent | 61.4 | 65.3 |
| Carbon, wt. percent | 24.5 | 22.8 |
| Hydrogen, wt. percent | 3.5 | 3.3 |
| Acid number | 1.2 | |
| Percent hydroxyl | 1.8 | 1.6 |

EXAMPLE 4

Pentaerythritol mono-(2,3-dibromopropyl) ether

This compound is prepared by the addition of a stoichiometric amount (or with, for example, from 1 to 10% in stoichiometrical excess) of liquid bromine to pentaerythritol monoallyl ether in carbon tetrachloride solvent at 0°–10° C. The reaction mixture is washed with a 2% sodium metabisulfite solution followed by an aqueous sodium bicarbonate wash and two water washes. The product is isolated by flashing off the carbon tetrachloride under vacuum and filtering the remaining material through diatomaceous earth. An analysis of the finished product follows:

|  | Found | Theoretical |
|---|---|---|
| Bromine, wt. percent | 47.0 | 47.6 |
| Carbon, wt. percent | 29.2 | 28.6 |
| Hydrogen, wt. percent | 5.0 | 4.8 |
| Acid number | 1.6 | |
| Percent hydroxyl | 12.8 | 15.2 |

EXAMPLE 5

This example illustrates the preparation of brominated allyl ethers, specifically brominated monoallyl ether and brominated diallyl ether, of AEH and which are herein sometimes identified for purposes of brevity as, respectively, DBMAE–AEH and TBDAE–AEH.

A flow sheet showing the various steps in the process, the processing details and recorded data are shown in FIG. 1 and FIG. 2 of the accompanying drawings wherein the meanings of the various symbols not previously identified are as follows:

DMK=Dimethyl ketone (acetone)
BuOH=n-Butanol

AEH PROCESSING DETAILS

Two separate AEH batches prepared and processed through atmospheric evaporation using the following amounts: (Reactant mole ratio: 8 to 1 to 1.2 HCHO to DMK to NaOH)

Charge A:
40 moles HCHO—8000 g. 15 wt. percent
5 moles DMK—296 g. (98%)

Charge B:
6 moles NaOH—246 g. (97%) dissolved in 980 g. H$_2$O

Reaction (Charge B added rapidly to Charge A)

Temp. adiabatic rise from 29° C. to 64° C.; Reacted for 60 min.; then acidified with HAc Atmospheric Evaporation; Distilled to base temp. of 100° C. (Each batch should contain 5 moles AEH and 6 moles NaFo.)

| Data | Brominated MAE-AEH | Brominated DAJ-AEH |
|---|---|---|
| Pressure Autoclave Operation: | | |
| Polyol concentrate weight, g | 2,143 | 2,179 |
| Moles allyl chloride added | 5.5 | 11.0 |
| Moles NaOH (added as 50 wt. percent) | 5.5 | 11.0 |
| Temp. range, °C | 80-80 | 80-95 |
| Pressure, p.s.i.g | 15-40 | 30-45 |
| Reaction time, hr | 2.5 | 2.5 |
| Topping Operation: | | |
| Moles allyl chloride recovered | 0.21 | 0.47 |
| Moles allyl reacted per mole AEH | 0.9 | 1.7 |
| Allyl chloride efficiency, percent | 83 | 83 |
| Butanol Extraction and Drying Phase, g.: | | |
| Two shake-outs using 1,000 cc., organic | 2,940 | 3,036 |
| BuOH each time at 50-60° C., aqueous | 1,715 | 2,348 |
| Distilled (1 atm.) to remove BuOH-H$^2$O azeotrope) | | |
| Filtration, Weight of salt removed, g | 31 | 20 |
| Bromination in BuOH: | | |
| Bromine used, g.-atoms | 9.06 | 16.2 |
| Product wt. after vacuum flashing of BuOH at 1-5 mm. HgA and 114° C. base temp., g | 1,970 | 2,600 |
| Over-all yield (based on DMK), percent | 90 | 91 |

The properties of the brominated allyl ethers of AEH of this example are opaque and contain traces of BuOH. They do not darken at 80° C. in the presence of air. Other properties and analytical data are tabulated below:

|  | Dibromo (DB) MAE-AEH | Tetra-bromo (TB) DAE-AEH |
|---|---|---|
| Ratio of allyl to AEH | 1:1 | 2:1 |
| Color | (¹) | (²) |
| Hydroxyl, wt. percent ³ | 10.65 | 6.7 |
| Bromine, wt. percent ³ | 37.5 | 46.3 |
| Carbonyl, wt. percent (as HCHO) | 0.02 | 0.05 |
| Ash, wt. percent | 0.2 | 0.02 |
| Unsaturation, wt. percent (as allyl) ³ | 0.5 | 0.5 |
| Viscosity at 210° F. (centistokes) | ⁴ 165-160 | ⁴ 127-115 |

¹ Dark Amber.
² Amber.
³ Hydroxyl values are lower than calculated, indicating that the secondary hydroxyl group of AEH does not yield completely to analysis; however, calculated values for unsaturation and for wt. percent Br present are in good agreement with the analytical values.
⁴ The viscosity of the bominated products decreases with time at 210° F. indicating that some degradation occurs.

EXAMPLE 6

This example illustrates the preparation of a brominated allyl ether of sorbitol, specifically the brominated diallyl ether of sorbitol, and which is herein sometimes identified for purpose of brevity as DAE-sorbitol, i.e., bis(dibromopropyl) ether of sorbitol and which is probably a mixture of isomers that includes bis(2,3-dibromopropyl) ether of sorbitol.

Figure 3:
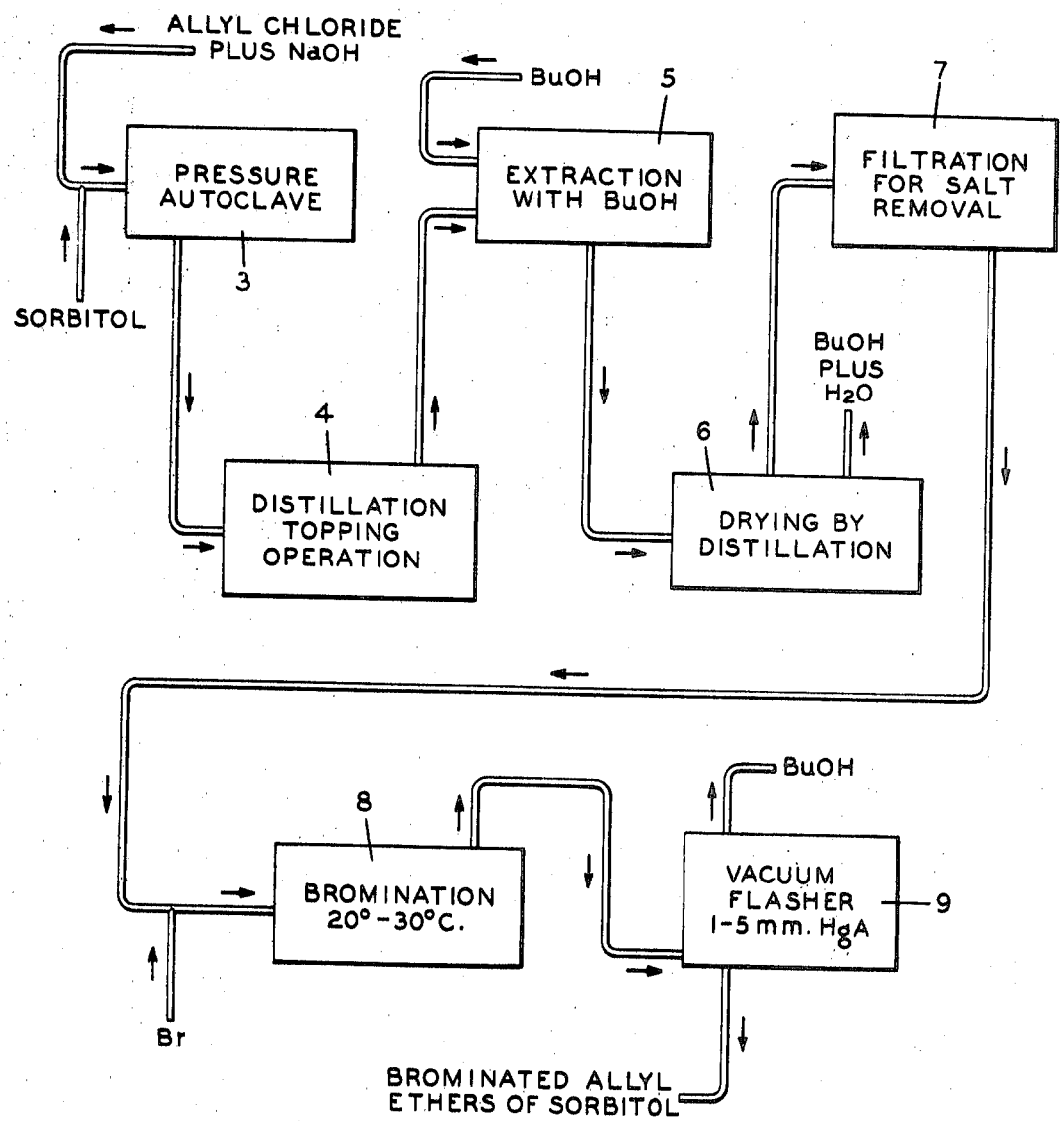

FIG. 3 of the accompanying drawings indicates the various steps in the process; the processing details and tabulated data are given below:

| Processing data | Brominated DAE-sorbitol |
|---|---|
| Pressure Autoclave Operation: | |
| Moles sorbitol added | ¹ 5 |
| Moles allyl chloride added | 12.5 |
| Moles NaOH (added as 50 wt. percent) | 12.5 |
| Temp. range, °C | 80-90 |
| Pressure, p.s.i.g | 25-40 |
| Reaction time, hr | 3 |
| Topping Operation: | |
| Moles allyl chloride recovered | 0.8 |
| Moles allyl reacted per mole sorbitol | 2 |
| Allyl chloride efficiency, percent | 86 |
| Butanol Extraction and Drying Phase, g.: | |
| Two shake-outs using 1,000 cc., organic | 2,913 |
| BuOH each time at 50-60° C., aqueous | 2,037 |
| (Distilled (1 atm.) to remove BuOH-H$^2$O azeotrope) | |
| Filtration, Weight of salts removed, g | 51 |
| Bromination, Bromine used, g.-atoms | 19.5 |
| Butanol Flashing: | |
| Evaporated to 110° C. at 1-5 mm. HgA for brominated sample. Weight obtained | 2,307 |
| Over-all yield (based on sorbitol) | 79 |

¹ 910 g. added to 200 cc. hot water.

The properties of tetrabromo DAE-sorbitol, which is opaque, are tabulated below, together with pertinent analytical data:

| | |
|---|---|
| Color | Dark amber |
| Ratio of allyl to polyol | 2:1 |
| Hydroxyl, wt. percent [1] | 7.0 |
| Bromine, wt. percent | 58.8 |
| Carbonyl, wt. percent (as HCHO) | 0.10 |
| Ash, wt. percent | 0.01 |
| Unsaturation, wt. percent (as allyl) | 0.20 |
| Acid, wt. percent (M.W. 100) | 0.08 |
| Viscosity at 210° F. (centistokes) | 123 |

[1] The hydroxyl value is lower than expected from the calculated value indicating either incomplete or sluggish reaction of hydroxyl in the compound by acetic anhydride analysis.

Brominated MAE-sorbitol, more particularly mono-(2,3-dibromopropyl) ether or sorbitol, is prepared as described above with reference to the preparation of tetrabromo DAE-sorbitol with the exception that 6.25 g. moles each of allyl chloride and of NaOH are used instead of 12.5 g. moles of each of said reactants, and only about 9.75 g. atoms of Br is used instead of 19.5 g.

The halogenated, specifically brominated, polyol ethers of this invention are particularly useful in the production of flame-retardant polyurethane foams, and especially rigid foams.

Foamed polyurethane resins are made by reacting a compound containing a plurality of isocyanate groups, e.g., tolylene diisocyanate, with a polyhydroxy compound. Upon bringing these reactants together, the isocyanate and hydroxyl groups of the compounds containing the same co-react to provide polyurethane linkages whereby the molecules are crosslinked and a solid, resinous structure is obtained. In forming such resins a gas-producing agent is commonly included and, as a result of its action, the resin (before it solidifies) is converted into a foamlike or cellular state. This cellular structure of the resin is permanently retained after the mixture has reacted sufficiently to yield a solid body.

An objectionable characteristic of these foamed polyurethane resins, which are useful as heat- and sound-insulating materials, as packaging materials, as cushioning materials in household, industrial and other applications, etc., is their poor flame resistance. Attempts to solve this problem have usually involved the addition of certain known fire-retardant substances, e.g., finely divided antimony trioxide. Such materials improve the flame resistance of the foamed resin provided that a sufficient amount thereof (e.g., 10% or more by weight) is used. However, the use of such large amounts of flame-retardant material causes stratification or separation or other problems in the production of the foam; and, in addition, is highly objectionable because it reduces the strength of the foam. Furthermore, such flame-retardant substances as antimony oxide yield a foam that has strong after-glow characteristics even after the ignited foam has been extinguished.

One proposed solution (see U.S. Pat. No. 3,134,742) to the foregoing problem is the incorporation into the foamable mixture of a system of synergistically co-acting flame-retarding agents. One of these agents is a substance containing a relatively high proportion of nitrogen and phosphorus, e.g., a polyamide of an oxyacid of phosphorus, and the other comprises a liquid phosphorus-containing polyol, e.g., a hydroxyalkyl ester of an oxyacid of pentavalent phosphorus.

One embodiment of the present invention comprises a different solution to the problem briefly described above with reference to the production of polyurethane foams having flame-retarding characteristics. Broadly, this embodiment comprises incorporating into a polyurethane resin in any manner whatsoever, but preferably in the form of a simple or mixed ester thereof, a halogenated, specifically brominated, polyol ether of the kind with which this invention is concerned.

Illustrative examples of organic polyisocyanates that can be used in practicing this embodiment of the present invention are listed below:

Tolylene-2,6-diisocyanate
Tolylene-2,4-diisocyanate
Diphenyl methane-4,4'-diisocyanate
m-Phenylene diisocyanate
4-isopropyl-1,3-phenylene diisocyanate
4-methoxy-1,3-phenylene diisocyanate
2,4-diisocyanato-diisopropyl-1,3-phenylene diisocyanate
4-chloro-1,3-phenylene diisocyanate
3,3'-dimethyl-4,4'-diisocyanatodiphenyl methane
3,3'-bitolylene-4,4'-diisocyanate
2,4-diisocyanatodiphenyl ether
4,4'-methylene-bis(phenylisocyanate)
Mesitylene diisocyanate
o-Nitrobenzidine diisocyanate
Durylene diisocyanate
Benzidine diisocyanate
Tetramethylene diisocyanate
4,4'-diisocyanato dibenzyl
1,5-naphthalene diisocyanate
Hexamethylene diisocyanate
Liquid polymethylene polyisocyanate (PAPI)
1,3,5-benzene triisocyanate
Tolylene-2,4,6-triisocyanate
2,4,4'-triisocyanatodiphenyl ether
Tritolylmethane triisocyanate Other examples include, for instance, the reaction product of tolylene diisocyanate with trimethylolpropane at an NCO/OH ratio of 2:1, and the reaction product of tolylene diisocyanate with 1,2,6-hexanetriol at an NCO/OH ratio of 2:1.

Instead of using an organic polyisocyanate as the reactant with the polyhydroxy compound (e.g., a hydroxyl-terminated polyester and/or a hydroxyl-terminated polyether) to form the polyurethane, there can be used prepolymers made by reacting a polyisocyanate, numerous examples of which have been given hereinbefore, with a polyhydroxy compound of the kind with which this invention is concerned either as such or in the form of a polyester thereof having terminal hydroxy groups, alone or admixed with a different polyester having terminal hydroxy groups, a polyhydric alcohol, a hydroxy-containing glyceride, etc. As prepolymers there may be admixed with those just described, as desired or as conditions may require, prepolymers from, for example, tolylene diisocyanate and, for instance, castor oil, blown tung oil, blown linseed oil or blown soya oil, prepolymers from tolylene diisocyanate and the polyester of ethylene glycol, propylene glycol and adipic acid having a molecular weight of, for instance, about 1900, and others such as are described in the prior art, for instance, in U.S. Pat. No. 3,133,978, column 6, lines 1-23, and in the patents referred to therein.

The halogenated, specifically brominated, monohydric or polyhydric ethers of this invention may be employed alone in forming simple or mixed polyesters for use in the polyurethane compositions by reaction of such hydroxy compounds with polycarboxylic acids such as malonic, adipic, succinic, sebacic, suberic, malic glutaric, maleic, fumaric, itaconic, aconitic, citraconic, phthalic, etc.; or they may be used in conjunction with other polyhydroxy compounds such as polyethylene glycols (average molecular weights of, for example, from 400 to 3000), polypropylene glycols having, for instance, the same average molecular weights just mentioned, trimethylolpropane, ethylene glycol, diethylene glycol, triethylene glycol, propylene glycol, dipropylene glycol, glycerol, 1,4-butanediol and others known in the art (see, for instance, U.S. Pat. No. 3,133,978, column 6, lines 24-47).

In preparing polyurethane foams a rigid foam is made, generally speaking, by utilizing a polyhydroxy-containing compound having a hydroxyl number of about 250–750; a semi-rigid foam, a polyhydroxy-containing compound having a hydroxyl number of about 75–250; and a flexible foam, a polyhydroxy-containing compound having a hydroxyl number of about 25–75. The halogenated compounds of this invention are especially useful in the production of rigid polyurethane foams and, somewhat less so, in making semi-rigid foams.

Any suitable blowing or foaming agent for the polyurethane resin may be employed. Foaming may be effected by reaction of the isocyanate-modified polyhydric compound with water; or, it may be effected by uniformly distributing a liquefied halogen-substituted alkane containing at least one fluorine atom in its molecule and having a boiling point at one atmosphere not higher than 80° F., and preferably not lower than −60° F., in the polyisocyanate reactant or in the polyhydroxy compound reactant. The reactants are then mixed, whereupon the reaction temperature increases during the resulting reaction to a temperature above the boiling point of the liquefied gas and a porous or cellular (i.e., foamed) polyurethane is produced. Examples of fluorine-containing compounds that are useful for this purpose include monofluorotrichloromethane, chlorodifluoromethane, dichlorodifluoromethane, dichlorotetrafluoroethane and dichloromonofluoromethane. Information concerning the foaming of polyurethane resins with such fluorine-containing compounds is given in, for instance, British Pat. No. 821,342.

Until gas-producing agents such as fluorine-containing compounds became in more common usage, the conventional method of liberating gas comprised the reaction of isocyanate groups in the organic polyisocyanate component with carboxy-containing compounds or with water present in the reaction mixture. By this technique $CO_2$ is liberated in situ. Under appropriate conditions this gas then becomes entrapped in the reaction mixture and, when the latter has become set or hardened, the resulting bubbles or cells are retained permanently in the resinous body; that is, a foamed or cellular resinous structure has been formed.

EXAMPLE 7

This example illustrates the utilization of brominated polyol ethers of the kind with which this invention is concerned as flame retardants in polyurethane foams.

(A) Preparation of prepolymers

"Control."—A prepolymer for use in a "control" polyurethane foam formulation is prepared by reacting together 3523.5 g. of tolylene diisocyanate (more particularly a mixture of the 2,4- and 2,6-isomers) and 780.3 g. of a conventional polyether of sorbitol, more particularly a conventional propylene oxide addition product of sorbitol.

This prepolymer is prepared by charging the tolylene diisocyanate (TDI) to a reaction vessel and heating it therein to 65° C. under a nitrogen atmosphere. The sorbitol polyether is then added slowly with agitation, being careful to control any exothermic reaction. The reaction mixture is heated with agitation to 90° C. and held at that temperature for 1 hour. The resulting prepolymer contains 29.8% reactive ("free") —NCO groups and has a viscosity of 4300 cps. at 30° C. The cooled prepolymer is bottled for subsequent use.

(1) Prepolymer of TDI and the brominated monoallyl ether of anhydroenneaheptitol (DBMAE–AEH).

Formulation

|  | G. |
|---|---|
| DBMAE–AEH | 103.8 |
| TDI | 396.2 |

The prepolymer is prepared by charging the tolylene diisocyanate (TDI) to a reaction vessel and heating therein to 70° C. under a nitrogen atmosphere. The brominated ether of the polyol (preheated if necessary to keep it fluid) is then added slowly, watching for the exothermic reaction to begin and keeping the temperature below 80° C. After all the brominated compound has been added, the exothermic reaction is allowed to subside. The reaction mass is then heated to 100° C. and held for 1 hour at that temperature after which it is cooled and bottled. The prepolymer contains 30.6% reactive —NCO groups and has a viscosity of 2000 cps. at 30° C.

(2) Prepolymer of TDI and the brominated diallyl ether of AEH (TBDAE–AEH).

Formulation

|  | G. |
|---|---|
| TBDAE–AEH | 133.3 |
| TDI | 366.7 |

The procedure is the same as in A–1 of this example. The prepolymer contains 28.9% reactive —NCO groups and has a viscosity of 302 cps. at 30° C.

(3) Prepolymer of TDI and the brominated monoallyl ether of pentaerythritol (DBMAE–PE).

Formulation

|  | G. |
|---|---|
| DBMAE–PE | 119 |
| TDI | 381 |

The procedure is the same as in A–1 of this example. The prepolymer contains 31.1% reactive —NCO groups and has a viscosity of 45 cps. at 30° C.

(4) Prepolymer of TDI and the brominated monoallyl ether of trimethylolpropane (DBMAE–TMP).

Formulation

|  | G. |
|---|---|
| DBMAE–TMP | 119.5 |
| TDI | 380.4 |

The procedure is the same as in A–1 of this example. The prepolymer contains 30.3% reactive —NCO groups.

(5) Prepolymer of TDI and the brominated diallyl ether of sorbitol (TBDAE–Sorb.).

Formulation

|  | G. |
|---|---|
| TBDAE-Sorb. | 130.8 |
| TDI | 369.2 |

The procedure is the same as in A–1 of this example. The prepolymer contains 30.6% reactive —NCO groups.

(B) Preparation of foamed polyurethanes.—"Control"

Formulation

|  | Grams |
|---|---|
| Prepolymer of "Control" of A | 150.0 |
| Polyether of sorbitol | 94.7 |
| Silicone oil surfactant (siloxaneoxyalkylene copolymer), e.g., silicone L–520 of Union Carbide | 1.2 |
| TMBA [1] (catalyst) | 2.3 |
| Freon–11 [2] (belowing agent) | 58.0 |

[1] TMBA=N,N,N′,N′-tetramethyl-1,3-butanediamine.
[2] Freon-11 is trichloromonofluoromethane.

The reactants of the above formulation and of the formulations that follow are mixed and reacted together in accordance with conventional practice.

(1) Formulation

|  |  |
|---|---|
| Prepolymer of A–1 | 125.1 |
| Polyether of sorbitol | 74.9 |
| Silicone oil surfactant as in control | 1.0 |
| Catalyst as in control | 2.0 |
| Blowing agent as in control | 47.4 |

(2) Formulation

| | |
|---|---|
| Prepolymer of A–2 | 127.7 |
| Polyether of sorbitol | 72.3 |
| Silicone oil surfactant as in control | 1.0 |
| Catalyst as in control | 2.0 |
| Blowing agent as in control | 47.4 |

(3) Formulation

| | |
|---|---|
| Prepolymer of A–3 | 124.3 |
| Polyether of sorbitol | 75.7 |
| Silicone oil surfactant as in control | 1.0 |
| Catalyst as in control | 2.0 |
| Blowing agent as in control | 47.4 |

(4) Formulation

| | |
|---|---|
| Prepolymer of A–4 | 125.6 |
| Polyether of sorbitol | 74.4 |
| Silicone oil surfactant as in control | 1.0 |
| Catalyst as in control | 2.0 |
| Blowing agent as in control | 47.4 |

(5) Formulation

| | |
|---|---|
| Prepolymer of A–5 | 125.0 |
| Polyether of sorbitol | 75.0 |
| Silicone oil surfactant as in control | 1.0 |
| Catalyst as in control | 2.0 |
| Blowing agent as in control | 47.4 |

Details of the mixing, rise and set times and of the results of tests on the foamed polyurethanes are given in the following table. The test for flammability characteristics is conducted in accordance with the "Tentative Method of Test for Flammability of Plastic Foams and Sheeting," ASTM D–1692–59–T. The "mix time" (also sometimes designated as the "cream time") is the time from the beginning of mixing or agitation (e.g., at 4500–5000 r.p.m. of the stirrer) to the beginning of frothing.

TABLE.—TEST CONDITIONS AND RESULTS IN PREPARING POLYURETHANE FOAMS FROM BROMINATED ETHERS OF POLYOLS

| | 7-B-1 | 7-B-2 | 7-B-3 | 7-B-4 | 7-B-5 | 7-B-Control |
|---|---|---|---|---|---|---|
| Mix time | (1) | (1) | (2) | (3) | (3) | (1) |
| Rise time | (4) | (4) | (4) | (4) | (4) | (4) |
| Set time | (5) | (5) | (6) | (6) | (6) | (7) |
| No. of specimens | 10 | 10 | 10 | 10 | 10 | |
| No. of burns | 10 | 10 | 10 | 10 | 10 | |
| Burning rate, in./min | 5.8 | 4.8 | 4.8 | 4.9 | 4.9 | 8.6 |
| Density, lbs./cu. ft | | | 1.3 | 1.4 | 1.4 | 1.4 |
| Humidity Aged: | | | | | | |
| No. of specimens | 10 | 10 | | | | 10 |
| No. of burns | 10 | 10 | | | | 10 |
| Burning rate | 7.4 | 8.5 | | | | 10.6 |
| Compressive strength at 5% deflection | 15.9 | 15.2 | 9.4 | 13.0 | 14.4 | 18.7 |
| Compressive strength at yield | 19.8 | 19.3 | 17.2 | 21.4 | 17.8 | 27.0 |
| Percent Br | 4.30 | 6.95 | 6.86 | 4.70 | 6.79 | 0 |

1 15 seconds.
2 25 seconds.
3 20 seconds.
4 3 minutes.
5 3.5 minutes.
6 5 minutes.
7 15 minutes.

From the foregoing description it will be seen that the present invention provides flame-retardant, polyurethane resins having chemically combined therein at least one brominated compound selected from the group consisting of brominated compounds of the kind hereinbefore described under sub-classes (A), (B) and (C). Preferably such polyurethane resins are cellular and are formed from (A) mixtures comprising:

(I) At least one organic polyisocyanate;

(II) At least one brominated compound represented by the general formula (XIII) 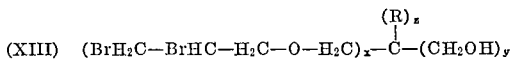

wherein R, when present, represents a radical selected from the group consisting of alkyl, aralkyl, hydroxyalkyl, aryl and alkaryl radicals, $x$ represents an integer from 1 to 2, inclusive, $y$ represents an integer from 2 to 3, inclusive, $z$ represents an integer from 0 to 1, inclusive, and $x+y+z$ equals 4; and (III) A blowing agent for polyurethane resins. Thus, the brominated compound of II may be, for example, mono(2,3-dibromopropyl) ether of trimethylolpropane, mono(2,3-dibromopropyl) ether of pentaerythritol, and/or bis(2,3-dibromopropyl) ether of pentaerythritol.

Or, (B) the flame-retardant, cellular, polyurethane resins are formed from mixtures comprising:

(I) At least one organic polyisocyanate;

(II) At least one brominated compound represented by the general formula (XIV) 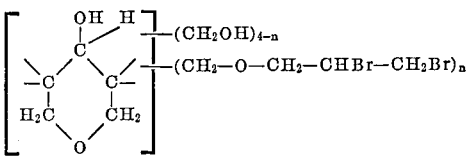

wherein $n$ represents a positive integer from 1 to 2, inclusive; and (III) A blowing agent for polyurethane resins. Thus, the brominated compound of II may be, for instance, a mono(2,3-dibromopropyl) ether or a bis(2,3-dibromopropyl) ether of AEH.

Or, (C) the flame-retardant, cellular, polyurethane resins are formed from mixtures comprising (a) at least one organic polyisocyanate; (b) at least one brominated, ethylenically-unsaturated aliphatic hydrocarbon ether of a sugar polyol; and (c) a blowing agent polyurethane resins. Thus, the brominated compound of (b) may be, for example, at least one dibromopropyl ether of sorbitol, e.g., mono- and/or bis(dibromopropyl) ether of sorbitol, more particularly 1-(2',3',-dibromopropyl) and/or 1,6-(2',3'-dibromopropyl) ether of sorbitol.

Catalysts and catalyst systems that are suitable for accelerating the reaction between the isocyanate and the halogen-, specifically bromine-, containing reactant include various tertiary-amine catalysts of which N,N,N',N'-tetramethyl-1,3-butanediamine used in Example 7 is a specific example; various organic tin catalysts, e.g., dibutyltin dilaurate; and combinations of tertiary amines and organic tin compounds. Illustrative examples of other such catalysts that may be used as herein described are given in, for instance, U.S. Pat. No. 3,159,591, col. 7, lines 36–57.

It is to be understood that the foregoing detailed description is given merely by way of illustration and not by way of limitation and that many variations may be made therein without departing from the spirit of the invention.

The embodiments of the invention in which an exclusive property or privilege is claimed are defined as follows:

1. A flame-retardant, polyurethane resin having chemically combined therein at least one brominated compound selected from the group consisting of
brominated compounds represented by the general formula

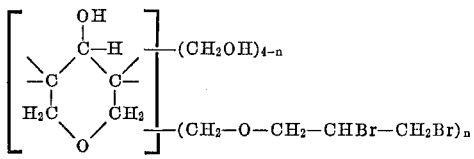

wherein n represents a positive integer from 1 to 4, inclusive, and 2,3-dibromopropyl ethers of sorbitol.

2. A flame-retardant, cellular, polyurethane resin which is formed from a mixture comprising:
(I) at least one organic polyisocyanate;
(II) at least one brominated compound represented by the general formula

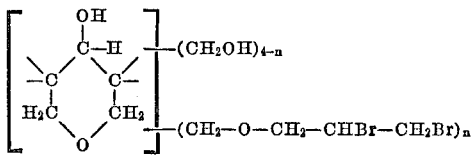

wherein n represents a positive integer from 1 to 2, inclusive; and
(III) a blowing agent for polyurethane resins.

3. A flame-retardant, cellular, polyurethane resin as in claim 2 wherein the brominated compound of II is mono-(2,3-dibromopropyl) ether of anhydroenneaheptitol.

4. A flame-retardant, cellular, polyurethane resin as in claim 2 wherein the brominated compound of II is bis-(2,3-dibromopropyl) ether of anhydroenneaheptitol.

5. A flame-retardant, cellular, polyurethane resin which is formed from a mixture comprising (a) an organic polyisocyanate; (b) bis(2,3-dibromopropyl) ether of sorbitol; and (c) a blowing agent for polyurethane resins.

References Cited
UNITED STATES PATENTS

| | | | |
|---|---|---|---|
| 3,244,754 | 4/1966 | Bruson et al. | 260—615 |
| 3,255,126 | 6/1966 | Fuzesi et al. | 260—2.5 |
| 3,260,687 | 7/1966 | Postol | 260—2.5 |
| 3,318,960 | 6/1967 | Earing | 260—615 |
| 3,385,900 | 5/1968 | Carpenter et al. | 260—615 |
| 3,419,532 | 12/1968 | Jackson | 260—77.5 |
| 3,252,922 | 5/1966 | Degener et al. | 260—2.5 |

DONALD E. CZAJA, Primary Examiner

M. J. WELSH, Assistant Examiner

U.S. Cl. X.R.
260—77.5